US010085231B2

(12) United States Patent
Jain et al.

(10) Patent No.: US 10,085,231 B2
(45) Date of Patent: *Sep. 25, 2018

(54) VEHICLE DETECTION

(71) Applicant: GOOGLE TECHNOLOGY HOLDINGS LLC, Mountain View, CA (US)

(72) Inventors: Amit Jain, Mundelein, IL (US); Michael E. Russell, Lake Zurich, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,722

(22) Filed: Dec. 12, 2017

(65) Prior Publication Data

US 2018/0103447 A1   Apr. 12, 2018

Related U.S. Application Data

(63) Continuation of application No. 13/922,416, filed on Jun. 20, 2013, now Pat. No. 9,844,018.

(51) Int. Cl.
*H04W 64/00* (2009.01)
*H04W 76/02* (2009.01)
(Continued)

(52) U.S. Cl.
CPC ........... *H04W 64/00* (2013.01); *H04W 4/008* (2013.01); *H04W 4/046* (2013.01); *H04W 4/80* (2018.02); *H04W 76/02* (2013.01); *H04W 76/10* (2018.02)

(58) Field of Classification Search
CPC ..... H04W 4/008; H04W 4/046; H04W 64/00; H04W 76/02
See application file for complete search history.

(56) References Cited

U.S. PATENT DOCUMENTS 6,181,996 B1   1/2001 Chou et al.
8,457,692 B2 *  6/2013 Fyke ...................... H04K 3/415
                                                340/5.64
(Continued)

FOREIGN PATENT DOCUMENTS

WO   WO 2008/051472 A1   5/2008
WO   WO 2012/099788 A1   7/2012

OTHER PUBLICATIONS

International Search Report and Written Opinion for PCT Application No. PCT/US2014/043415 dated Sep. 4, 2014, 9 pgs.

*Primary Examiner* — Mohamed Barakat
(74) *Attorney, Agent, or Firm* — Morgan, Lewis & Bockius LLP

(57) ABSTRACT

This application is directed to a method for initiating a driver mode or a passenger mode of an electronic device. A first wireless device determines whether a second wireless device associated with the user is communicatively connected to a vehicle. The second wireless device is distinct from the first wireless device. In accordance with determination that the second wireless device is connected to the vehicle, the first wireless device causes at least one of the first wireless device, the second wireless device and the vehicle kit device to operate in the driver mode configured for exchanging information between a driver and the vehicle. In accordance with determination that the second wireless device is not connected to the vehicle, the first wireless device detects that the first client device operates in proximity to the vehicle, and prevents the first and second wireless devices from operating in the driver mode.

20 Claims, 5 Drawing Sheets

(51) Int. Cl.
*H04W 4/00* (2018.01)
*H04W 4/04* (2009.01)
*H04W 76/10* (2018.01)
*H04W 4/80* (2018.01)

(56) References Cited

U.S. PATENT DOCUMENTS

| | | |
|---|---|---|
| 8,527,146 B1 | 9/2013 | Jackson et al. |
| 2006/0253282 A1* | 11/2006 | Schmidt ............... G07C 5/0808 |
| | | 704/233 |
| 2007/0140187 A1 | 6/2007 | Rokusek et al. |
| 2008/0167806 A1 | 7/2008 | Wheeler et al. |
| 2010/0066492 A1 | 3/2010 | Tarmoom et al. |
| 2010/0112964 A1* | 5/2010 | Yi ........................ G04G 9/0064 |
| | | 455/90.3 |
| 2010/0188248 A1* | 7/2010 | Sultan ................. B60R 25/1003 |
| | | 340/12.53 |
| 2012/0161927 A1 | 6/2012 | Pierfelice et al. |
| 2012/0232742 A1 | 9/2012 | Elliott |
| 2012/0258702 A1 | 10/2012 | Matsuyama |
| 2013/0173374 A1 | 7/2013 | Weiss |
| 2013/0244625 A1 | 9/2013 | Brakensiek et al. |
| 2014/0163774 A1* | 6/2014 | Demeniuk ............. G08C 17/02 |
| | | 701/2 |

* cited by examiner

VEHICLE DETECTION

RELATED APPLICATIONS

This application is a continuation of and claims priority to U.S. patent application Ser. No. 13/922,416, filed Jun. 20, 2013, entitled "Vehicle Detection," which is hereby incorporated by reference in its entirety.

BACKGROUND

Currently, many users spend a significant amount of time each day in vehicles, such as cars, motorcycles, buses, trains, boats, and planes. Drivers and passengers of a vehicle may want access to certain information when they are in the vehicle, such as driving directions, maps, or information about gas prices at nearby gas stations. While current vehicle systems may provide some information to users, users would like a more convenient way to access real time information relevant to being in a vehicle. Furthermore, it can be difficult to accurately detect whether a user is in a vehicle, and if the user is in a vehicle, whether the user is the driver of the vehicle or a passenger in the vehicle.

BRIEF DESCRIPTION OF THE DRAWINGS

Embodiments of vehicle detection are described with reference to the following Figures. The same numbers may be used throughout to reference like features and components that are shown in the Figures.

DETAILED DESCRIPTION

Figure 1:
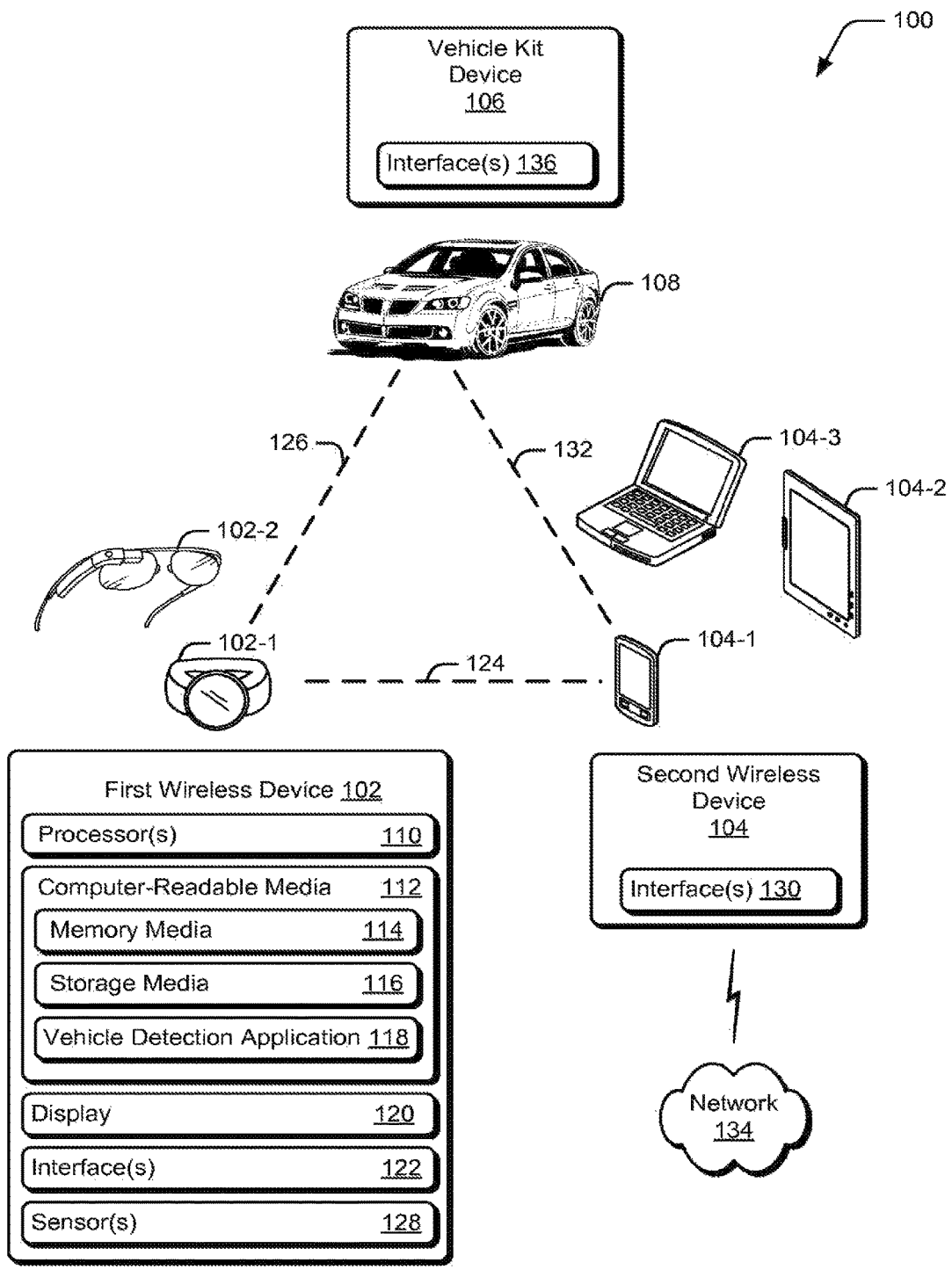
FIG. 1 illustrates an example system in which embodiments of vehicle detection can be implemented.

Currently, many users spend a significant amount of time each day in vehicles, such as cars, motorcycles, buses, trains, boats, and planes. A computing device that is able to detect when a user is in a vehicle can be configured to automatically provide relevant information and experiences to the user, such as driving directions, maps, or information about gas prices at nearby gas stations.

Wearable wireless devices, such as smart watches and smart glasses, are increasingly being utilized by users. These devices can provide relevant information and experiences to the user when the user's context is known. In accordance with various embodiments, when a wearable device determines that a user is in a vehicle, the device can provide information that is relevant to the user being in the vehicle. It can be difficult, however, to accurately detect whether a user is in vehicle, and if the user is in the vehicle, whether the user is the driver of the vehicle or a passenger in the vehicle.

Wearable devices may be configured to connect to other wireless devices, such as a user's smart phone or tablet device. Often, a user will wear a wearable device and carry an additional wireless device at the same time. For example, a user might wear a smart watch on her wrist, and carry a smart phone in her purse. When a wireless connection is established between a wearable device and an additional wireless device, the wearable device is able to monitor a connection status of the additional wireless device with other wireless devices. For example, many smart phones are configured to wirelessly connect to vehicle kit devices that enable hands-free calling, and a variety of other features. Thus, monitoring the connection status of a wireless device can enable a wearable device to detect when a user is in a vehicle based on the wireless device being connected to a vehicle kit device associated with the vehicle.

In embodiments of vehicle detection, a first wireless device includes an interface to establish a wireless connection with a second wireless device. In some embodiments, the first wireless device is a wearable device, such as a smart watch, and the second wireless device is a communication device, such as a smart phone. The first wireless device includes a vehicle detection application that is configured to determine whether the second wireless device is connected to a vehicle kit device associated with a vehicle. If it is determined that the second wireless device is connected to the vehicle kit device, the vehicle detection application determines that the user is a driver of the vehicle and initiates a driver mode on at least one of the first wireless device, the second wireless device, or the vehicle kit device. Alternately, if the second wireless device is not connected to the vehicle kit device associated with the vehicle, the first wireless device scans to detect the vehicle kit device. If the vehicle kit device is detected, the vehicle detection application determines that the user is a passenger in the vehicle, and initiates a passenger mode on at least one of the first wireless device, the second wireless device, or the vehicle kit device.

Both the driver mode and the passenger mode cause at least one of the first wireless device, the second wireless device, or the vehicle kit device to provide information or experiences that are relevant to the user being in the vehicle. In some cases, the driver mode and the passenger mode are different, because drivers may want different information than passengers. Furthermore, the way in which the information is provided or presented may also be different because drivers are focusing on the road and may be less able to view displayed information than a passenger.

While features and concepts of vehicle detection can be implemented in any number of different devices, systems, and/or configurations, embodiments of vehicle detection are described in the context of the following example devices, systems, and methods.

FIG. 1 illustrates an example environment 100 in which techniques for vehicle detection can be implemented. Example environment 100 includes a first wireless device 102, a second wireless device 104, and a vehicle kit device 106 that is implemented in a vehicle 108. By way of example, and not limitation, vehicle 108 can be implemented as a car, motorcycle, bus, train, boat, or plane.

In some embodiments, first wireless device 102 is a wearable device, and is illustrated in example 100, by way of example and not limitation, as including a smart watch 102-1 and smart glasses 102-2. It is to be appreciated, however, that first wireless device 102 can be implemented as any type of mobile device, laptop, tablet, smart phone, or any other type of wearable wireless device, such as a smart ring, or a smart bracelet, to name just a few.

First wireless device 102 includes processors 110 and computer-readable media 112, which includes memory media 114 and storage media 116. Computer-readable media 112 also includes vehicle detection application 118, which will be described in more detail below. First wireless device 102 further includes a display 120 that can be controlled to render images for viewing. For example, display 120 can render images on a face of smart watch 102-1, or render 2D, 3D, and/or virtual images that are viewable by a wearer of smart glasses 102-2. Such images may include information relevant to a user being in a vehicle, such as driving directions, maps, or information about gas prices at nearby gas stations.

First wireless device 102 may also include interface(s) 122 that enable wired and/or wireless communication of data. Interfaces 122 can include wireless personal-area-network (WPAN) radios compliant with various WPAN standards, such as IEEE 802.15 standards, Bluetooth™ standards, infrared data association (IrDA) standards, or wireless USB standards, to name just a few. Interfaces 122 can also include, by way of example and not limitation, wireless local-area-network (WLAN) radios compliant with any of the various IEEE 802.11 (also referred to as WiFi™) standards, wireless-wide-area-network (WWAN) radios for cellular telephony, wireless-metropolitan-area-network (WMAN) radios compliant with various IEEE 802.16 (also referred to as WiMAX™) standards, and wired local-area-network (LAN) Ethernet transceivers.

In example 100, interface 122 enables first wireless device 102 to establish a wireless connection 124 with second wireless device 104. In some embodiments, wireless connection 124 may be a transport-agnostic WPAN communication link. Wireless connection 124 enables data to be communicated wirelessly between first wireless device 102 and second wireless device 104. Interface 122 may further enable first wireless device 102 to scan for and detect other wireless devices, such as vehicle kit device 106, via a wireless link 126.

First wireless device 102 may also include one or more sensors 128 that are configured to receive sensor data, such as sensor data corresponding to movement. Sensors 128 can include an accelerometer sensor configured to receive accelerometer data, a global positioning system (GPS) sensor configured to receive GPS data, or any other type of sensor configured to sense movement. First wireless device 102 can also be implemented with any number and combination of differing components as further described with reference to the example device shown in FIG. 5.

Second wireless device 104 is illustrated in example 100 as a smart phone 104-1. It is to be appreciated, however, that second wireless device 104 may also be implemented, by way of example and not limitation, as a tablet 104-2, a laptop 104-3, or any other type of phone, mobile device, portable device, or second wireless device.

Similar to first wireless device 102, second wireless device 104 includes interface(s) 130 that enable wired and/or wireless communication of data. Interfaces 130 can include WPAN radios compliant with various WPAN standards, such as IEEE 802.15 standards, Bluetooth™ standards, IrDA standards, or wireless USB standards, to name just a few. Interfaces 130 can also include, by way of example and not limitation, WLAN radios compliant with any of the various IEEE 802.11 (also referred to as WiFi™) standards, WWAN radios for cellular telephony, WMAN radios compliant with various IEEE 802.16 (also referred to as WiMAX™) standards, and wired LAN Ethernet transceivers.

In example 100, interface 130 enables second wireless device 104 to establish wireless connection 124 with first wireless device 102. Interface 130 further enables second wireless device 104 to establish a wireless connection 132 with vehicle kit device 106. In some embodiments, wireless connection 132 may be an active WPAN link that enables communication between second wireless device 104 and vehicle kit device 106. Interfaces 130 may also include an interface that enables second wireless device 104 to communicate over a cellular communication network 134, such a Global System for Mobile Communications (GSM) network, a Long Term Evolution (LTE) network, a Code Division Multiple Access (CDMA) network, or a Wideband Code Division Multiple Access (WCDMA) network.

Second wireless device 104 also includes a processing system and a computer-readable storage medium, and can also be implemented with any number and combination of differing components as further described with reference to the example device shown in FIG. 5.

Vehicle kit device 106 is a wireless device that can be implemented in a vehicle, such as vehicle 108, pictured as a car in example 100. Vehicle kit device 106 can be installed in vehicle 108, or can be a removable device that can be placed in vehicle 108. Vehicle kit device 106 enables other wireless devices, such as first wireless device 102 or second wireless device 104, to connect to the vehicle kit device over a wireless network, such as a WPAN. In some cases, vehicle kit device 106 is implemented as a hands-free device that enables hands-free communication through vehicle 108. For example, vehicle kit device 106 can enable a user of second wireless device 104 to place calls while second wireless device 104 is in the user's pocket or purse.

Similar to first wireless device 102 and second wireless device 104, vehicle kit device 106 includes interface(s) 136 that enable wired and/or wireless communication of data. Interfaces 136 can include WPAN radios compliant with various WPAN standards, such as IEEE 802.15 standards, Bluetooth™ standards, IrDA standards, or wireless USB standards, to name just a few. Interfaces 136 can also include, by way of example and not limitation, WLAN radios compliant with any of the various IEEE 802.11 (also referred to as WiFi™) standards, WWAN radios for cellular telephony, WMAN radios compliant with various IEEE 802.16 (also referred to as WiMAX™) standards, and wired LAN Ethernet transceivers.

In example 100, interface 136 enables vehicle kit device 106 to establish wireless connection 132 with second wireless device 104. In some embodiments, wireless connection 132 may be an active WPAN link. Vehicle kit device 106 also includes a processing system and a computer-readable storage medium, and can also be implemented with any number and combination of differing components as further described with reference to the example device shown in FIG. 5.

In various embodiments, interface 130 of second wireless device 104 and interface 136 of vehicle kit device 106 each include a wireless module that includes various profiles that enable communication between the devices. A profile is a specification associated with an aspect of wireless communication between devices. A wireless device can use a profile of an additional wireless device if the wireless device is compatible with a subset of the profiles on the additional wireless device. For example, the profiles of interfaces 130 and 136 enable a user of second wireless device 104 to make and receive calls through vehicle kit device 106.

Figure 2:
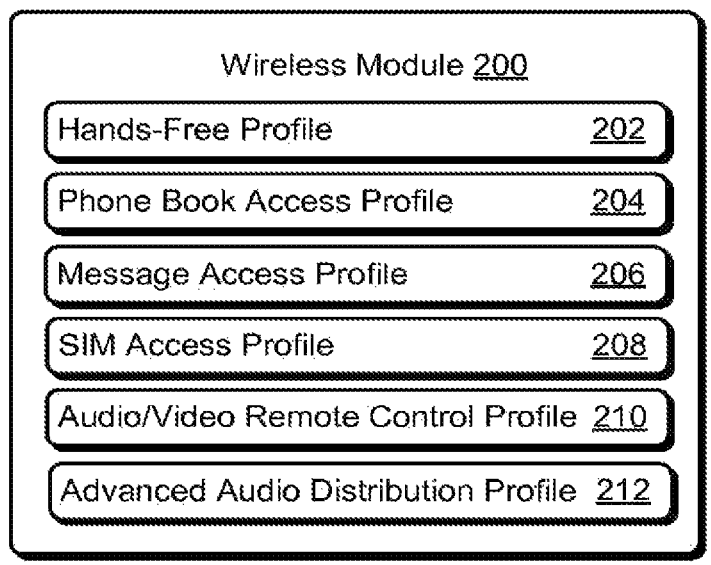
FIG. 2 illustrates an example wireless module.

FIG. 2 illustrates an example wireless module 200 that includes various profiles. In this example, the profiles of wireless module 200 include a Hands-Free Profile (HFP) 202, a Phone Book Access Profile (PBAP) 204, a Message Access Profile (MAP) 206, a SIM Access Profile (SAP) 208, an Audio/Video Remote Control Profile (AVRCP) 210, and an Advanced Audio Distribution Profile (A2DP) 212. It is to be noted, that devices 104 and 106 may include all or a subset of profiles 202-212. Further, in some cases devices 104 and 106 may include profiles not pictured in wireless module 200. In some embodiments, profiles 202-212 may be compliant with various WPAN standards, such as IEEE 802.15 standards, Bluetooth™ standards, IrDA standards, or wireless USB standards, to name just a few.

HFP 202 enables vehicle kit device 106 to communicate with second wireless device 104 when second wireless device 104 is in vehicle 108. Typically, Hands-Free profile 202 uses communication packets, such as synchronous connection oriented (SCO) packets or enhanced synchronous connection oriented (eSCO) packets, to communicate audio data between devices. As an example, Hand-Free profile 202 enables a user of second wireless device 104 to place a call through vehicle kit device 106 when the second wireless device is in the user's pocket or purse.

PBAP 204 enables the exchange of phone book data between devices. As an example, when a phone call is received on second wireless device 104, PBAP 204 enables vehicle kit device 106 to display the name of the incoming caller on a display of vehicle 108.

MAP 206 enables the exchange of messages between devices. As an example, when a text message is received on second wireless device 104, MAP 206 enables vehicle kit device 106 to display the text message on a display of vehicle 108 and/or provide an audible reading of the text message to the user through a sound system of vehicle 108. SAP 208 enables vehicle kit device 106 to connect to a SIM card in second wireless device 104. AVRCP 210 enables playback control of audio or video. A2DP 212 enables streaming of audio between vehicle kit device 106 and second wireless device 104.

Vehicle Detection Application

First wireless device 102 and second wireless device 104 may each be associated with a single user. The user, for example, can wear smart watch 102-1 on her wrist and carry smart phone 104-1 in her purse. First wireless device 102 is configured to establish wireless connection 124 with second wireless device 104. To establish wireless connection 124 with second wireless device 104, either first wireless device 102 or second wireless device 104 initiates a discovery process to find the other device, and then establishes wireless connection 124. In some embodiments, wireless connection 124 may be a transport-agnostic WPAN communication link. Wireless connection 124 enables information to be passed between first wireless device 102 and second wireless device 104. Once wireless connection 124 is established, each time that first wireless device 102 and second wireless device 104 are powered on, the devices may automatically discover and connect to each other via wireless connection 124.

In accordance with various embodiments, vehicle detection application 118 is configured to detect that a user is in vehicle 108 based on a connection status of second wireless device 104 with vehicle kit device 106. In some embodiments, vehicle detection application 118 can determine whether the user is a driver, or an operator, of vehicle 108 or a passenger in vehicle 108. This determination can be based on an assumption that the driver is likely the owner of vehicle 108, and has configured second wireless device 104 to automatically connect to vehicle kit device 106. Thus, by detecting that second wireless device 104 is connected to vehicle kit device 106, vehicle detection application 118 can determine that the user is the driver of vehicle 108. Alternately, if vehicle kit device 106 is detected, but vehicle detection application 118 determines that second wireless device 104 is not connected to vehicle kit device 106, then vehicle detection application 118 can determine that the user is a passenger in vehicle 108.

Determining a Driver of a Vehicle

Vehicle detection application 118 can determine that second wireless device 104 is connected to vehicle kit device 106, to determine that the user is the driver of vehicle 108, in a variety of different ways. In some instances, vehicle detection application 118 can determine that second wireless device 104 is connected to vehicle kit device 106 by monitoring a connection status of second wireless device 104. For example, if the connection status of second wireless device 104 changes to be connected to vehicle kit device 106 via wireless connection 132, vehicle detection application 118 determines that second wireless device 104 is connected to vehicle kit device 106.

In some cases, vehicle detection application 118 can determine that second wireless device 104 is connected to vehicle kit device 106 based on the profiles of vehicle kit device 106. For example, certain profiles like PBAP 204, MAP 206, and SAP 208 are most commonly supported only by vehicle kit devices and mobile phones, whereas other profiles, such as AVRCP 210, may be supported by other wireless devices. Therefore, in some embodiments, first wireless device 102 can monitor connections of second wireless device 104. If second wireless device 104 connects to a wireless device with a profile indicative of a vehicle kit device, then vehicle detection application 118 can determine that the user is the driver of vehicle 108.

Alternately or additionally, vehicle detection application 118 can determine that second wireless device 104 is connected to vehicle kit device 106 based on a notification, received from second wireless device 104, indicating that second wireless device 104 is connected to vehicle kit device 106. For example, when second wireless device 104 connects to vehicle kit device 106 via wireless connection 132, second wireless device 104 can transmit a notification to first wireless device 102, via wireless connection 124, which indicates second wireless device 104 is connected to vehicle kit device 106.

Alternately or additionally, vehicle detection application 118 can determine that second wireless device 104 is connected to vehicle kit device 106 based on an indication of a name or manufacturer of device 106 received from second wireless device 104. For example, many vehicle manufacturers use a personalized name for their vehicle kit devices. When two wireless devices connect, each device may obtain information about each respective device. Thus, when second wireless device 104 connects to device 106 via wireless connection 132, second wireless device 104 may determine a name and/or manufacturer of device 106. Second wireless device 104 can then transmit the name or manufacturer of device 106 to first wireless device 102 via wireless connection 124. Based on the name or manufacturer of device 106, vehicle detection application 118 can determine whether device 106 is a vehicle kit device, and in turn, whether the user is in vehicle 108. In some cases, vehicle detection application 118 may determine whether device 106 is a vehicle kit device, and in turn, whether the user is in vehicle 108 by accessing a database, either at first wireless device 102 or online, which associates names and/or manufacturers of devices with types of devices.

Alternately or additionally, vehicle detection application 118 can determine that second wireless device 104 is connected to vehicle kit device 106 based on a device identifier of device 106 received from second wireless device 104.

The device identifier can be, for example, a media access control (MAC) address of device 106. Vehicle detection application 118 can then search a database, either at first wireless device 102 or online, that associates device identifiers to device manufacturers to determine a manufacturer of device 106. Then, based on the name or manufacturer of device 106 that second wireless device 104 is connected to, vehicle detection application 118 can determine whether device 106 is a vehicle kit device, and in turn, whether the user is in vehicle 108.

Alternately or additionally, vehicle detection application 118 can determine that second wireless device 104 is connected to vehicle kit device 106 based on an identifier of second wireless device 104 extracted from communication packets transmitted from device 106 to second wireless device 104. For example, by establishing the connection with second wireless device 104, first wireless device 102 knows an identifier, such as a MAC address, of second wireless device 104. Therefore, first wireless device 102 can listen for communication packets addressed to the MAC address of second wireless device 104. For example, first wireless device 102 can sniff at a frequency spectrum, such as the 2.4 GHZ frequency spectrum, for communication packets that include the identifier of second wireless device 104. In particular, when sniffing the frequency spectrum, such as the 2.4 GHz spectrum, the first wireless device 102 can determine whether the device 106 that the second wireless device 104 is connected to supports PBAP 204, MAP 206 or SAP 208. If the device 106 supports PBAP 204, MAP 206 or SAP 208, the first wireless device 102 can determine that device 106 is a vehicle kit.

Determining a Passenger of a Vehicle

In various embodiments, vehicle detection application 118 is further configured to determine that a user is a passenger in vehicle 108 based on detecting vehicle kit device 106, but determining that second wireless device 104 is not connected to vehicle kit device 106. The determination that the user is a passenger in vehicle 108 may be based on an assumption that the driver is most likely the person that owns vehicle 108, so a wireless device of the driver will connect to vehicle kit device 106. Passengers in vehicle 108 are likely not the owner of vehicle 108, however, and thus wireless devices of passengers are not likely to connect to vehicle kit device 106.

Accordingly, vehicle detection application 118 can determine that the second wireless device is not connected to vehicle kit device 106, and then scan for and detect vehicle kit device 106. Vehicle detection application 118 can then determine that the user is a passenger in vehicle 108 based on both determining that second wireless device 104 is not connected to vehicle kit device 106 and detecting vehicle kit device 106.

To determine that second wireless device 104 is not connected to vehicle kit device 106, vehicle detection application 118 can implement the various procedures described above to determine that there is no information indicating that second wireless device 104 is connected to vehicle kit device 106.

To detect vehicle kit device 106, vehicle detection application 118 can initiate first wireless device 102 to scan for vehicle kit devices. As noted above, some profiles such as PBAP 204, MAP 206 or SAP 208 are most commonly supported only by vehicle kit devices and mobile phones. Thus, in some embodiments, vehicle detection application 118 can initiate first wireless device 102 to scan for wireless devices which support profiles that are supported only by vehicle kit devices. If a wireless device that includes one of these profiles is located, vehicle detection application 118 can determine that a vehicle kit device is nearby and that the user is likely in a vehicle.

Alternately or additionally, to detect vehicle kit device 106, vehicle detection application 118 can initiate first wireless device 102 to scan for communication packets transmitted between wireless devices. As noted above, Hands-Free profile 202 typically uses communication packets, such as SCO packets or eSCO packets to communicate audio data between devices. Thus, if communication packets are detected, vehicle detection application 118 can determine that a vehicle kit device is nearby and that the user is in a vehicle.

The techniques described above enable vehicle detection application 118 to predict with a high confidence whether a user is a driver or a passenger in vehicle 108. In some embodiments, however, vehicle detection application 118 is configured to trigger additional logic to determine that the user is in vehicle 108.

In particular, vehicle detection application 118 may trigger sensors 128 to determine whether at least one of first wireless device 102 or second wireless device 104 is moving at a speed or acceleration corresponding to being in a vehicle. Sensors 128 can be accelerometers, gyroscopes, magnetometers, barometers, or a GPS radio, to name a few. If sensors 128 detect movement above a threshold, for example 15 miles per hour, it can be assumed that the user is in a vehicle. On the other hand, if movement at a speed less than 15 miles per hour is detected, it can be assumed that the user is not in a vehicle. Additionally, if the user is stationary, such as sitting down at a restaurant, for example, data from the sensors 128 may indicate that the user is not in vehicle 108.

Initiating a Vehicle Mode

Responsive to determining that the user is in vehicle 108, vehicle detection application 118 initiates a vehicle mode on at least one of first wireless device 102, second wireless device 104, or vehicle kit device 106. The vehicle mode provides experiences and/or information to the user that are relevant to the user being in vehicle 108. The information can be provided to the user in a variety of different ways and formats. For example, vehicle detection application 118 can initiate first wireless device 102 to display information relevant to the user being in a vehicle on display 120, such as a location of a nearest gas station. Alternately or additionally, vehicle detection application 118 can initiate second wireless device 104 or vehicle kit device 106 to display information relevant to the user being in a vehicle on a display of second wireless device 104 or on a display of vehicle kit device 106. Vehicle detection application 118 can also initiate first wireless device 102, second wireless device 104, and/or vehicle kit device 106 to provide audible information to the user, such as by providing an audible alert when a gas station is nearby.

By way of example and not limitation, the information provided to the user can include maps, driving directions, points-of-interest data, fuel prices at nearby gas stations, vehicle mileage information, accident reports, traffic information, or any other type of information that might be relevant to the user being in a vehicle.

In some embodiments, the vehicle mode is configured to provide the user with other experiences relevant to the user being in vehicle 108. For example, if it is determined that the user is the driver of vehicle 108, and the user receives a phone call, vehicle detection application 118 can initiate transmission of a message to the caller that the user is driving and is therefore unable to talk. As another example, the vehicle mode can be configured to only accept calls or texts from family members when the user is driving.

In some embodiments, vehicle detection application 118 initiates a driver mode responsive to determining that the user is the driver of vehicle 108, and initiates a passenger mode responsive to determining that the user is a passenger in vehicle 108. It is to be noted that drivers may want different information than passengers. Thus, the driver mode and the passenger mode may provide the user with different information. Furthermore, vehicle detection application 118 may provide or present information differently to the driver, than it does to a passenger, because the driver may be focused on driving. For example, drivers may receive audible alerts of points-of-interest, whereas passengers may receive visual alerts. In some embodiments, if it is determined that the user is the driver, activity of second wireless device 104 can be screened to ensure that the driver is not distracted. In this case, passengers in the vehicle can have less or no screening of activity of second wireless device 104.

Implementation Example

Figure 3:
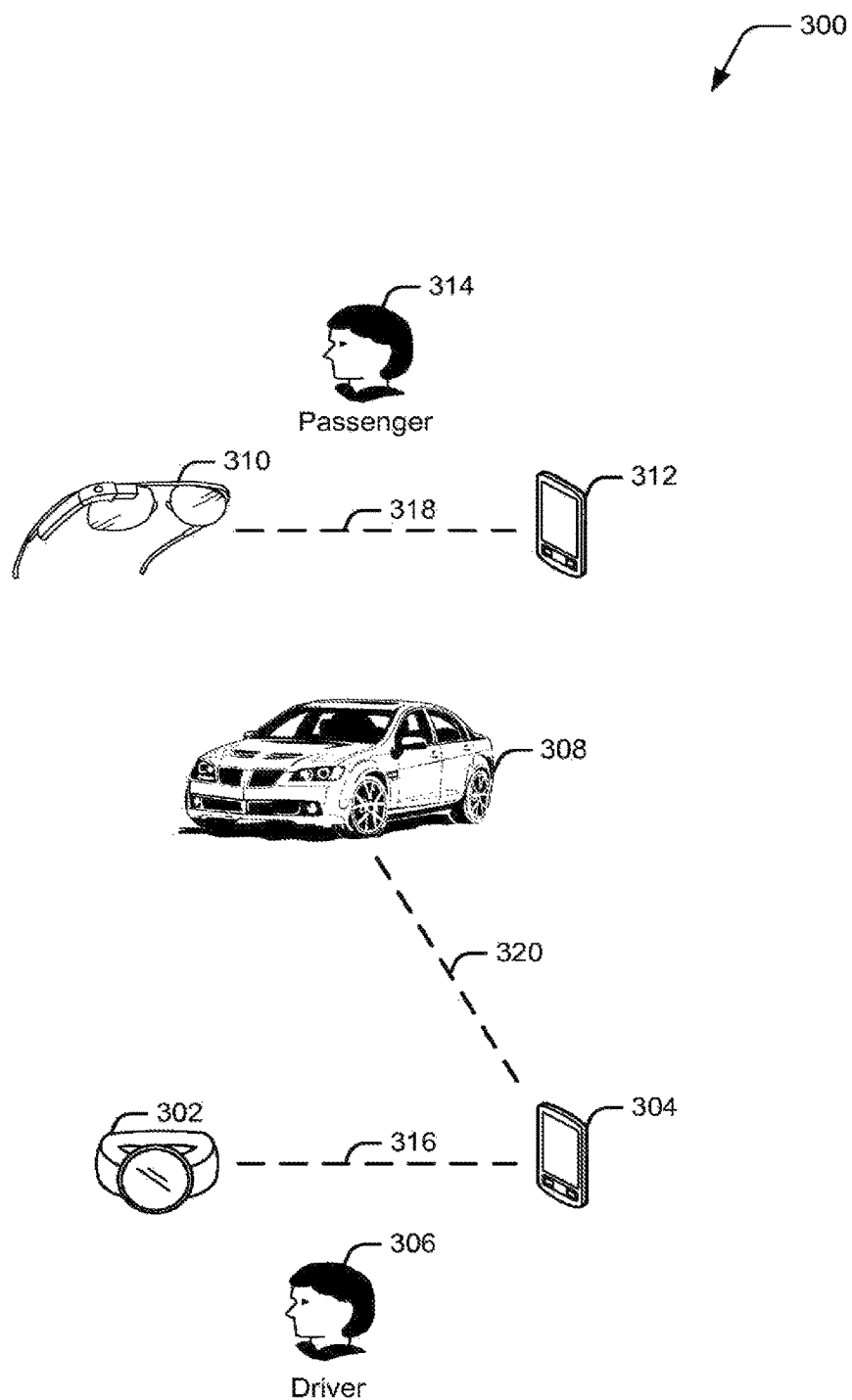
FIG. 3 illustrates an implementation example of a driver and a passenger of a vehicle in accordance with various embodiments of vehicle detection.

FIG. 3 illustrates an implementation example 300 of a driver and a passenger of a vehicle in accordance with various embodiments of vehicle detection. In example 300, a smart watch 302 and a first smart phone 304 are associated with a driver 306 of a vehicle 308 that includes vehicle kit device 106 (not pictured). In addition, smart glasses 310 and a second smart phone 312 are associated with a passenger 314 of vehicle 308. In this example, both smart watch 302 and smart glasses 310 include at least a memory and a processor to implement vehicle detection application 118 (not pictured). FIG. 3 will now be further described with reference to FIG. 4, which illustrates an example method 400 of vehicle detection.

Example Method

Figure 4:
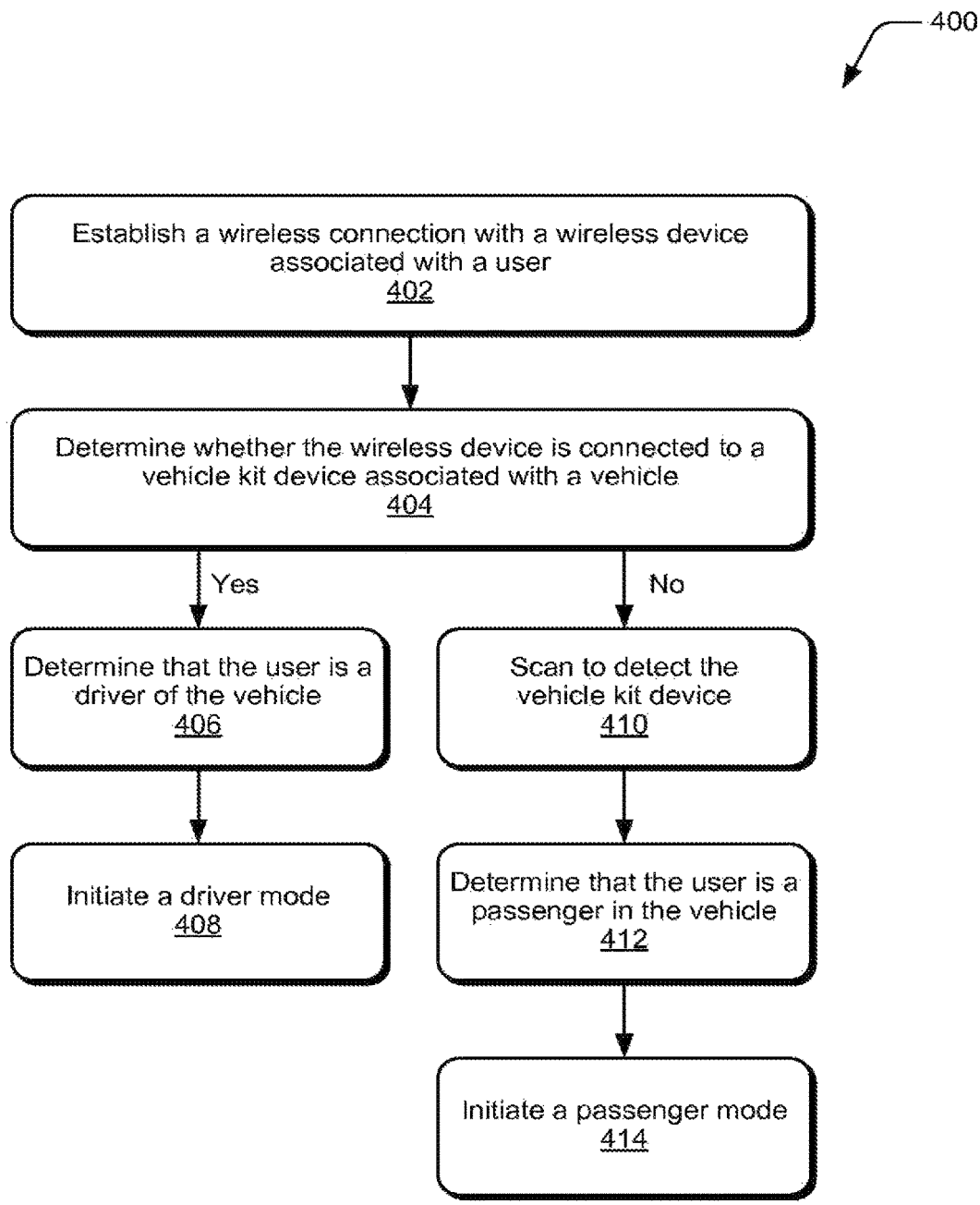
FIG. 4 illustrates example method(s) of vehicle detection in accordance with one or more embodiments.

FIG. 4 illustrates an example method 400 of vehicle detection. The order in which the method blocks are described are not intended to be construed as a limitation, and any number or combination of the described method blocks can be combined in any order to implement a method, or an alternate method. Example method 400 is described with reference to FIGS. 1 and 3 in accordance with one or more embodiments of vehicle detection. Generally, any of the methods, components, and modules described herein can be implemented using software, firmware, hardware (e.g., fixed logic circuitry), manual processing, or any combination thereof. A software implementation represents program code that performs specified tasks when executed by a computer processor, and the program code can be stored in computer-readable storage media devices.

Block 402 establishes a wireless connection with a wireless device associated with a user. For example, first wireless device 102 (FIG. 1) establishes wireless connection 124 with second wireless device 104 associated with a user.

Consider block 402 with regards to FIG. 3. Prior to getting into vehicle 308, smart watch 302, worn on the wrist of driver 306, establishes a first wireless connection 316 with first smart phone 304. Similarly, smart glasses 310, worn by passenger 314, establishes a second wireless connection 318 with second smart phone 312.

Block 404 determines whether the second wireless device 104 is connected to a vehicle kit device associated with a vehicle. For example, vehicle detection application 118, implemented at first wireless device 102, determines whether second wireless device 104 is connected to vehicle kit device 106 associated with vehicle 108.

If it is determined that the second wireless device 104 is connected to the vehicle kit device associated with the vehicle, block 406 determines that the user is a driver of the vehicle, and block 408 initiates a driver mode. For example, responsive to determining that second wireless device 104 is connected to vehicle kit device 106 associated with vehicle 108, vehicle detection application 118 determines that the user is the driver of vehicle 108, and initiates a driver mode on first wireless device 102, second wireless device 104, and/or vehicle kit device 106.

Continuing with example 300, after the driver and passenger enter into vehicle 308, first smart phone 304 of driver 306 may automatically establish a third wireless connection 320 with vehicle kit device 106 of vehicle 308. Third wireless connection 320 of first smart phone 304 with vehicle kit device 106 may enable driver 306 to place and receive phone calls on first smart phone 304 through vehicle kit device 106. Vehicle detection application 118, implemented at smart watch 302, can monitor the connection status of first smart phone 304 to determine that first smart phone 304 is connected to vehicle kit device 106. Based on this connection to vehicle kit device 106, vehicle detection application 118 determines that driver 306 is the driver of vehicle 308, and initiates a driver mode on smart watch 302, first smart phone 304, and/or vehicle kit device 106. Based on this determination, for example, vehicle detection application 118 causes information relevant to driver 306 being the driver of vehicle 308 to be presented on the display face of smart watch 302, and/or causes smart watch 302 to provide an audible alert to driver 306 when a point-of-interest is nearby.

Alternately, if it is determined that the second wireless device 104 is not connected to the vehicle kit device associated with the vehicle, block 410 scans to detect the vehicle kit device. If the vehicle kit device is detected, block 412 determines that the user is a passenger in the vehicle, and block 414 initiates a passenger mode. For example, responsive to determining that second wireless device 104 is not connected to vehicle kit device 106 associated with vehicle 108, vehicle detection application 118 causes interface 122 to scan to detect vehicle kit device 106. If vehicle kit device 106 is detected, vehicle detection application 118 determines that the user is a passenger in vehicle 108, and initiates a passenger mode on first wireless device 102, second wireless device 104, and/or vehicle kit device 106.

Continuing with example 300, after driver 306 and passenger 314 enter into vehicle 308, second smart phone 312 of passenger 314 does not connect with vehicle kit device 106 because passenger 314 does not own vehicle 308 and/or has not configured second smart phone 312 to connect to vehicle kit device 106. As mentioned above, however, first smart phone 304 of driver 306 is connected to vehicle kit device 106 via third wireless connection 320. Vehicle detection application 118, implemented at smart glasses 310, monitors the connection status of second smart phone 312, and determines that second smart phone 312 is not connected to vehicle kit device 106.

Vehicle detection application 118, at smart glasses 310, can then scan to detect vehicle kit device 106, such as by scanning to detect communication packets or by scanning to locate wireless devices with profiles indicative of a vehicle kit device. In this case, vehicle detection application 118 may detect communication packets transmitted via third wireless connection 320 between first smart phone 304 and vehicle kit device 106. Alternately or additionally, vehicle detection application 118, implemented at smart glasses 310, may detect vehicle kit device 106 by scanning to detect wireless devices with profiles indicative of a vehicle kit device.

Based on the determination that second smart phone 312 is not connected to vehicle kit device, and based on the detection of vehicle kit device 106, vehicle detection application 118, implemented at smart glasses 310, determines that the user is a passenger in vehicle 308. Vehicle detection application 118 then initiates a passenger mode on smart glasses 310, second smart phone 312, or vehicle kit device 106. As described above, the passenger mode may include different information than the driver mode initiated by vehicle detection application 118 at smart watch 302.

Figure 5:
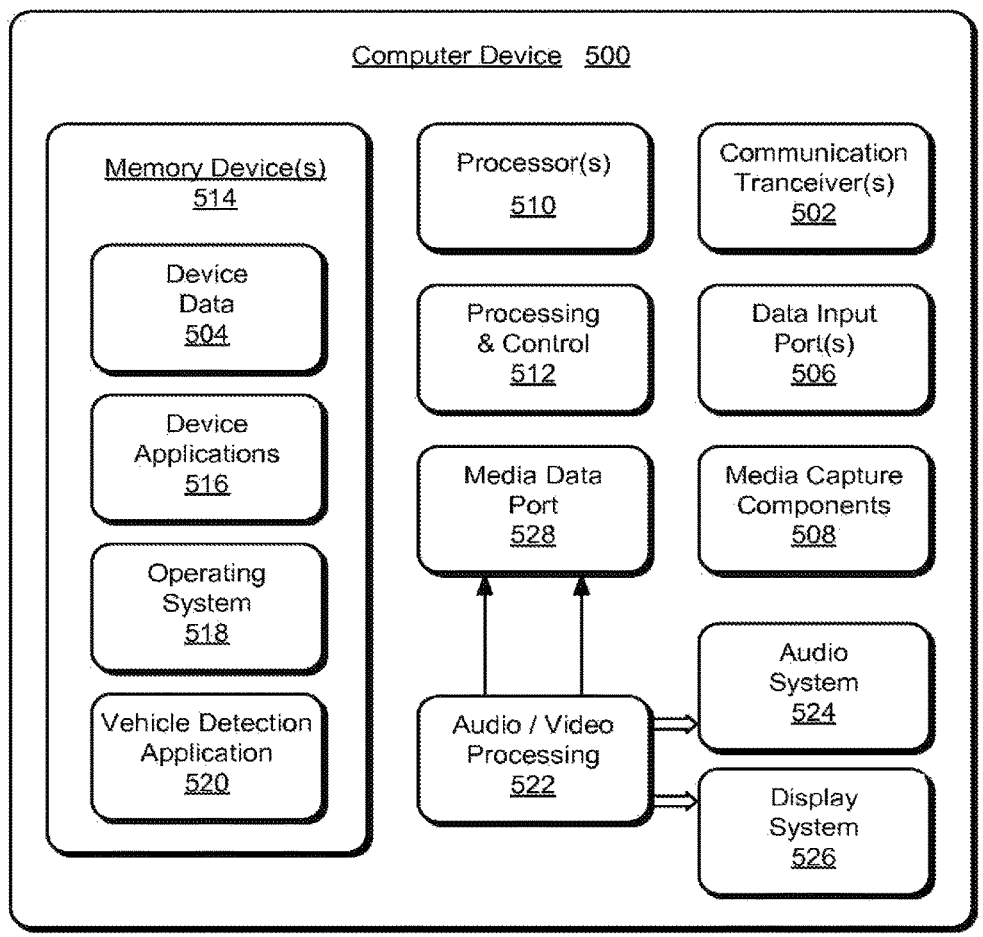
FIG. 5 illustrates various components of an example computer device that can implement embodiments of vehicle detection.

FIG. 5 illustrates various components of an example computer device 500 that can be implemented as any device described with reference to any of the previous FIGS. 1-4, such as first wireless device 102, second wireless device 104, or vehicle kit device 106. The computer device may be implemented as any one or combination of a fixed or mobile device, in any form of a consumer, computer, portable, user, communication, phone, navigation, gaming, media playback, and/or computer device.

The computer device 500 includes communication transceivers 502 that enable wired and/or wireless communication of device data 504, such as received data, data that is being received, data scheduled for broadcast, data packets of the data, etc. Example communication transceivers 502 include wireless personal-area-network (WPAN) radios compliant with various IEEE 802.15 standards, Bluetooth™ standards, wireless local-area-network (WLAN) radios compliant with any of the various IEEE 802.11 (also referred to as WiFi™) standards, wireless-wide-area-network (WWAN) radios for cellular telephony, wireless-metropolitan-area-network (WMAN) radios compliant with various IEEE 802.16 (also referred to as WiMAX™) standards, and wired local-area-network (LAN) Ethernet transceivers.

The computer device 500 may also include one or more data input ports 506 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the computer device to components, peripherals, or accessories such as microphones or cameras. Additionally, the computer device 500 may include media capture components 508, such as an integrated microphone to capture audio and a camera to capture still images and/or video media content.

The computer device 500 includes one or more processors 510 (e.g., any of microprocessors, controllers, and the like), which process computer-executable instructions to control operation of the device. Alternatively or in addition, the computer device can be implemented with any one or combination of software, hardware, firmware, or fixed logic circuitry that is implemented in connection with processing and control circuits, which are generally identified at 512. Although not shown, the computer device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computer device 500 also includes one or more memory devices 514 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer device 500 may also include a mass storage media device.

A memory device 514 provides data storage mechanisms to store the device data 504, other types of information and/or data, and various device applications 516 (e.g., software applications). For example, an operating system 518 can be maintained as software instructions within a memory device and executed on the processors 510. The device applications may also include a device manager, such as any form of a control application, software application, signal-processing and control module, code that is native to a particular device, a hardware abstraction layer for a particular device, and so on. In embodiments, the computer device also includes a vehicle detection application 520. Vehicle detection application 520 is an example of vehicle detection application 118 at first wireless device 102 shown in FIG. 1.

The computer device 500 also includes an audio and/or video processing system 522 that generates audio data for an audio system 524 and/or generates display data for a display system 526. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 528. Additionally, the audio system and/or the display system may be external components to the computer device, or alternatively, are integrated components of the example computer device.

Although embodiments of vehicle detection have been described in language specific to features and/or methods, the subject of the appended claims is not necessarily limited to the specific features or methods described. Rather, the specific features and methods are disclosed as example implementations of vehicle detection.

What is claimed is:

1. A method, comprising:
at a first wireless device associated with a user, wherein the first wireless device comprises one or more processors and memory storing one or more programs to be executed by the one or more processors:
executing a vehicle detection application, including:
determining whether a second wireless device that is associated with the user is communicatively connected to a vehicle, wherein the second wireless device is distinct from the first wireless device;
in accordance with determination that the second wireless device is connected to the vehicle, causing at least one of the first wireless device, the second wireless device and the vehicle to operate in a driver mode configured for exchanging information between a driver and the vehicle; and
in accordance with determination that the second wireless device is not connected to the vehicle, detecting that the first wireless device operates in proximity to the vehicle, and preventing the first and second wireless devices from operating in the driver mode.

2. The method of claim 1, further comprising:
in accordance with a determination that the user is the passenger, causing at least one of the first wireless device, the second wireless device and the vehicle to operate in a passenger mode.

3. The method of claim 2, wherein the user is determined as the passenger of the vehicle based on sensor data configured to indicate that at least one of the first wireless device and the second wireless device is moving at a speed or acceleration corresponding to vehicle movement.

4. The method of claim 2, wherein operating in the passenger mode comprises causing the at least one of the first wireless device, the second wireless device and the vehicle to present data relevant to a vehicle passenger.

5. The method of claim 4, wherein the data relevant to the vehicle passenger comprises one or more visual alerts.

6. The method of claim 1, wherein operating in the driver mode comprises causing the at least one of the first wireless device, the second wireless device and the vehicle to present data relevant to a vehicle driver.

7. The method of claim 6, wherein causing the at least one of the first wireless device, the second wireless device and the vehicle to present data relevant to the vehicle driver comprises presenting traffic data, vehicle operational data, or telephonic data in such a manner as to reduce a possible distraction to the driver of the vehicle.

8. The method of claim 6, wherein the data relevant to the vehicle driver comprises a subset of a map data, driving directions data, points-of-interest data, fuel data, vehicle service station data, vehicle operational data, and traffic data.

9. The method of claim 6, wherein the data relevant to the vehicle driver comprises one or more audible alerts configured to limit a possible distraction of the driver of the vehicle.

10. The method of claim 1, wherein determining whether the second wireless device is communicatively connected to the vehicle comprises receiving a message from the second wireless device, and wherein the message comprises an indication that the second wireless device is communicatively connected to the vehicle.

11. A wearable wireless device, comprising:
one or more processors; and
memory storing one or more programs to be executed by the one or more processors, the one or more programs including instructions for:
executing a vehicle detection application, including:
determining whether a second wireless device that is associated with the user is communicatively connected to a vehicle, wherein the second wireless device is distinct from the wearable wireless device;
in accordance with determination that the second wireless device is connected to the vehicle, causing at least one of the wearable wireless device, the second wireless device and the vehicle to operate in a driver mode configured for exchanging information between a driver and the vehicle; and
in accordance with determination that the second wireless device is not connected to the vehicle, detecting that the wearable wireless device operates in proximity to the vehicle, and preventing the wearable and second wireless devices from operating in the driver mode.

12. The wearable wireless device of claim 11, wherein determining whether the second wireless device is communicatively connected to the vehicle comprises detecting communication packets transmitted from the vehicle to the second wireless device, and wherein the communication packets comprise an identifier of the second wireless device.

13. The wearable wireless device of claim 11, wherein detecting the vehicle further comprises scanning for communication packets.

14. The wearable wireless device of claim 11, wherein the one or more programs further comprise instructions for:
in accordance with a determination that the user is a passenger, causing at least one of the wearable wireless device, the second wireless device and the vehicle to operate in a passenger mode.

15. The wearable wireless device of claim 11, wherein determining that the second wireless device is communicatively connected to the vehicle further comprises receiving an indication from the second wireless device, and the indication includes a name of the vehicle, a manufacturer of the vehicle, or a combination thereof.

16. A non-transitory computer readable medium, storing one or more programs for execution by one or more processors of a first wireless device associated with a user, the one or more programs comprising instructions for:
executing a vehicle detection application, including:
determining whether a second wireless device that is associated with the user is communicatively connected to a vehicle, wherein the second wireless device is distinct from the first wireless device;
in accordance with determination that the second wireless device is connected to the vehicle, causing at least one of the first wireless device, the second wireless device and the vehicle to operate in a driver mode configured for exchanging information between a driver and the vehicle; and
in accordance with determination that the second wireless device is not connected to the vehicle, detecting that the first wireless device operates in proximity to the vehicle, and preventing the first and second wireless devices from operating in the driver mode.

17. The non-transitory computer readable medium of claim 16, wherein the one or more programs further comprise instructions for:
in accordance with a determination that the user is a passenger, causing at least one of the first wireless device, the second wireless device and the vehicle to operate in a passenger mode.

18. The non-transitory computer readable medium of claim 16, wherein determining that the second wireless device is communicatively connected to the vehicle further comprises:
receiving a device identifier of the vehicle from the second wireless device; and
searching a database configured to associate device identifiers to device manufacturers to determine a manufacturer of the vehicle.

19. The non-transitory computer readable medium of claim 18, wherein the device identifier of the vehicle comprises a media access control (MAC) address of the vehicle.

20. The non-transitory computer readable medium of claim 16, wherein the first wireless device comprises a wearable wireless electronic device, and the second wireless device comprises a mobile electronic device.

* * * * *

UNITED STATES PATENT AND TRADEMARK OFFICE
CERTIFICATE OF CORRECTION

PATENT NO. : 10,085,231 B2
APPLICATION NO. : 15/839722
DATED : September 25, 2018
INVENTOR(S) : Jain et al.

Page 1 of 2

It is certified that error appears in the above-identified patent and that said Letters Patent is hereby corrected as shown below:

On the Title Page

(57) Abstract, Line 4, please delete "with the user" and insert --with a user--;

(57) Abstract, Line 6, please delete "with determination" and insert --with a determination--;

(57) Abstract, Line 7, please delete "is connected" and insert --is communicatively connected--;

(57) Abstract, Line 12, please delete "with determination" and insert --with a determination--;

(57) Abstract, Lines 12-13, please delete "is not connected to" and insert --is not communicatively connected to--;

In the Claims

Claim 1, Column 12, Line 59, please delete "with determination" and insert --with a determination--;

Claim 1, Column 12, Line 60, please delete "is connected" and insert --is communicatively connected--;

Claim 1, Column 12, Line 65, please delete "with determination" and insert --with a determination--;

Claim 1, Column 12, Line 66, please delete "is not connected" and insert --is not communicatively connected--;

Claim 2, Column 13, Line 4, please delete "user is the" and insert --user is a--;

Claim 11, Column 13, Line 50, please delete "with the user" and insert --with a user--;

Claim 11, Column 13, Line 53, please delete "with determination" and insert --with a determination--;

Signed and Sealed this
Fourth Day of December, 2018

Andrei Iancu
*Director of the United States Patent and Trademark Office*

CERTIFICATE OF CORRECTION (continued)
U.S. Pat. No. 10,085,231 B2

Claim 11, Column 13, Line 54, please delete "is connected" and insert --is communicatively connected--;

Claim 11, Column 13, Line 59, please delete "with determination" and insert --with a determination--;

Claim 11, Column 13, Line 60, please delete "is not connected" and insert --is not communicatively connected--;

Claim 16, Column 14, Line 31, please delete "with determination" and insert --with a determination--;

Claim 16, Column 14, Line 32, please delete "is connected" and insert --is communicatively connected--;

Claim 16, Column 14, Line 37, please delete "with determination" and insert --with a determination--;

Claim 16, Column 14, Line 38, please delete "is not connected" and insert --is not communicatively connected--.